US010682270B2

United States Patent
Zhang et al.

(10) Patent No.: US 10,682,270 B2
(45) Date of Patent: Jun. 16, 2020

(54) SEAT, MOTION CONTROL METHOD THEREOF AND MOTION CONTROL SYSTEM THEREOF

(71) Applicant: BOE TECHNOLOGY GROUP CO., LTD., Beijing (CN)

(72) Inventors: Xiao Zhang, Beijing (CN); Fan Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 224 days.

(21) Appl. No.: 15/681,872

(22) Filed: Aug. 21, 2017

(65) Prior Publication Data

US 2018/0185210 A1 Jul. 5, 2018

(30) Foreign Application Priority Data

Jan. 4, 2017 (CN) .......................... 2017 1 0005216

(51) Int. Cl.
| | | |
|---|---|---|
| *A61G 5/04* | (2013.01) | |
| *A61G 5/10* | (2006.01) | |
| *B60L 15/00* | (2006.01) | |
| *G06K 9/00* | (2006.01) | |
| *G05D 1/02* | (2020.01) | |

(Continued)

(52) U.S. Cl.
CPC .............. *A61G 5/04* (2013.01); *A61G 5/1051* (2016.11); *B60L 15/00* (2013.01); *G05D 1/00* (2013.01); *G05D 1/0246* (2013.01); *G06K 9/00369* (2013.01); *A61G 2203/10* (2013.01); *A61G 2203/22* (2013.01); *B60L 15/20* (2013.01); *B60L 50/50* (2019.02); *B60L 2200/34* (2013.01); *G05D 2201/0206* (2013.01)

(58) Field of Classification Search
CPC .... A61G 5/04; A61G 2203/10; A61G 5/1051; A61G 2203/22; G05D 1/0246; G05D 1/00; G05D 2201/0206; G06K 9/00369; G06K 9/00268; G06K 9/00335; G06K 9/4604; G06K 9/4652; G06K 9/6201; G06K 9/6202; B60L 15/00; B60L 50/50; B60L 15/20; B60L 2200/34; G06T 2207/30196; G06T 2207/30201
See application file for complete search history.

(56) References Cited

U.S. PATENT DOCUMENTS

| | | | |
|---|---|---|---|
| 9,948,917 B2 * | 4/2018 | Inacio De Matos | ........................ G05D 1/0246 |
| 2007/0284845 A1 | 12/2007 | Roovers et al. | |
| 2009/0012666 A1 * | 1/2009 | Simpson | .................. A61G 5/04 701/23 |

FOREIGN PATENT DOCUMENTS

| | | |
|---|---|---|
| CN | 102895093 A | 1/2013 |
| CN | 203122803 U | 8/2013 |

(Continued)

OTHER PUBLICATIONS

Chinese Office Action in Chinese Application No. 201710005216.0, dated Mar. 1, 2019 with English translation.

*Primary Examiner* — Nga X Nguyen
(74) *Attorney, Agent, or Firm* — Collard & Roe, P.C.

(57) ABSTRACT

A seat, a motion control method thereof and a motion control system thereof. The motion control method for the seat includes: acquiring images of around the seat, and tracking a current caregiver via image recognition; determining a relative position between the current caregiver and the seat; and controlling a motion of the seat based on the relative position.

9 Claims, 2 Drawing Sheets

(51) Int. Cl.
*G05D 1/00* (2006.01)
*B60L 50/50* (2019.01)
*B60L 15/20* (2006.01)

(56) References Cited

FOREIGN PATENT DOCUMENTS

| | | |
|---|---|---|
| CN | 205665587 U | 10/2016 |
| CN | 106097656 A | 11/2016 |
| CN | 106155065 A | 11/2016 |
| KR | 20160061782 A | 6/2016 |

* cited by examiner

SEAT, MOTION CONTROL METHOD THEREOF AND MOTION CONTROL SYSTEM THEREOF

CROSS REFERENCE TO RELATED APPLICATIONS

Applicant claims priority under 35 U.S.C. § 119 of Chinese Application No. 201710005216.0 filed on Jan. 4, 2017, the disclosure of which is incorporated by reference.

TECHNICAL FIELD

Embodiments of the present disclosure relate to a seat, a motion control method thereof and a motion control system thereof.

BACKGROUND

The caregiver (for example, parents or nursing personnel) will put a person to be nursed (for example, a child or an elderly person) in a seat when busy to prevent an accident from occurring on the person to be nursed. For the convenience of observing the person to be nursed and for the sake of enhancing the sense of security of the person to be nursed, the front face of the person to be nursed is usually face the caregiver. However, the caregiver have to consume a lot of energy to observe and move the person to be nursed, and it is difficult for the person to be nursed to see the caregiver without interruptions, so the use experience of the caregiver and the person to be nursed can be affected, and the safety of the seat can be also reduced.

SUMMARY

One embodiment of the present disclosure provides a motion control system for a seat, which comprises: an image acquisition device configured to capture images of around the seat; a drive device configured to drive the seat to move; and a control device configured to track a current caregiver by performing image recognition based on images captured by the image acquisition device, determine a relative position between the current caregiver and the seat, and control the drive device to move the seat based on the relative position.

For example, in the motion control system provided by one embodiment of the present disclosure, the image acquisition device includes at least one first image acquisition unit; and the first image acquisition unit is mounted on the seat and configured to capture the images of around the seat.

For example, in the motion control system provided by one embodiment of the present disclosure, the image acquisition device also includes at least one second image acquisition unit; and the second image acquisition unit is mounted on the seat and configured to monitor a person to be nursed.

For example, the motion control system provided by one embodiment of the present disclosure further comprises a distance determination device, the distance determination device is configured to measure and/or calculate a current distance between the seat and the current caregiver.

For example, in the motion control system provided by one embodiment of the present disclosure, the control device is also configured to determine whether or not the person to be nursed acts in a dangerous way by performing behavior analysis on images captured by the second image acquisition unit, and output an alarm when the person to be nursed acts in a dangerous way.

Another embodiment of the present disclosure provides a motion control method for a seat, which comprises: acquiring images of around the seat, and tracking a current caregiver via image recognition; determining a relative position between the current caregiver and the seat; and controlling a motion of the seat based on the relative position.

For example, in the motion control method provided by another embodiment of the present disclosure, the steps of determining the relative position between the current caregiver and the seat and controlling the motion of the seat based on the relative position include: determining whether or not the current caregiver is in front of the seat based on the images of around the seat; and rotating the seat to allow the current caregiver to be in front of the seat in a case that the current caregiver is not in front of a person to be nursed.

For example, in the motion control method provided by another embodiment of the present disclosure, the steps of determining the relative position between the current caregiver and the seat and controlling the motion of the seat based on the relative position include: determining a current distance between the seat and the current caregiver; and moving the seat until the seat is within a preset distance range in a case that the current distance exceeds the preset distance range.

For example, in the motion control method provided by another embodiment of the present disclosure, image recognition includes: extracting feature information of the current caregiver, and performing feature matching with the feature information of the current caregiver, such that the current caregiver can be tracked.

For example, the motion control method provided by another embodiment of the present disclosure further comprises: determining the current caregiver, the steps of determining the current caregiver includes determining the current caregiver by manual settings and/or automatically determining the current caregiver; and the steps of automatically determining the current caregiver include: extracting feature information of humans in captured images; determining an candidate caregiver list by performing feature matching between the feature information of the humans and feature information in an candidate caregiver feature library; and determining the current caregiver based on preset priority information of caregivers and the candidate caregiver list.

For example, in the motion control method provided by another embodiment of the present disclosure, the current caregiver is determined by executing a query at a set interval.

Further another embodiment of the present disclosure provides a seat, which comprises the above-mentioned motion control system.

Still another embodiment of the present disclosure provides a motion control system for a seat, which comprises an image acquisition device, a drive device, a processor, a memory, and computer program instructions stored in the memory, upon the processor running the computer program instructions, the motion control system performs a following method comprising: tracking a current caregiver by performing image recognition according to images of around the seat acquired by the image acquisition device; determining a relative position between the current caregiver and the seat on the basis of acquired position information; and controlling the drive device to move the seat based on the relative position.

For example, in the motion control system provided by still another embodiment of the present disclosure, the steps of determining the relative position between the current caregiver and the seat and controlling the drive device to move the seat based on the relative position include: determining whether or not the current caregiver is in front of the seat based on the images of around the seat; and rotating the seat to allow the current caregiver to be in front of the seat in a case that the current caregiver is not in front of a person to be nursed.

For example, in the motion control system provided by still another embodiment of the present disclosure, the steps of determining the relative position between the current caregiver and the seat and controlling the drive device to move the seat based on the relative position include: determining a current distance between the seat and the current caregiver; and moving the seat until the seat is within a preset distance range in a case that the current distance exceeds the preset distance range.

For example, in the motion control system provided by still another embodiment of the present disclosure, image recognition includes: extracting feature information of the current caregiver, and performing feature matching with the feature information of the current caregiver, such that the current caregiver can be tracked.

For example, the motion control system provided by still another embodiment of the present disclosure further comprises: determining the current caregiver, the step of determining the current caregiver includes determining the current caregiver by manual settings and/or automatically determining the current caregiver; and the steps of automatically determining the current caregiver include: extracting feature information of the humans in captured images; determining an candidate caregiver list by performing feature matching between the feature information of the humans and feature information in an candidate caregiver feature library; and determining the current caregiver based on preset priority information of caregivers and the candidate caregiver list.

For example, in the motion control system provided by still another embodiment of the present disclosure, the current caregiver is determined by executing a query at a set interval.

BRIEF DESCRIPTION OF THE DRAWINGS

In order to clearly illustrate the technical solution of the embodiments of the disclosure, the drawings used in the description of the embodiments or relevant technologies will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," and the like, which are used in the description and the claims of the present application for disclosure, are not intended to indicate any sequence, amount or importance, but distinguish various components. Also, the terms such as "a," "an," and etc., are not intended to limit the amount, but indicate the existence of at least one. The terms "comprise," "comprising," "include," "including," and the like, are intended to specify that the elements or the objects stated before these terms encompass the elements or the objects and equivalents thereof listed after these terms, but do not preclude the other elements or objects. The phrases "connect", "connected", and the like, are not intended to define a physical connection or mechanical connection, but can include an electrical connection, directly or indirectly. "On," "under," "right," "left" and the like are only used to indicate relative position relationship, and when the position of the object which is described is changed, the relative position relationship may be changed accordingly.

Embodiments of the present disclosure provide a seat, a motion control method for the seat, and a motion control system for the seat, and automatic rotation and/or translation of the seat can be realized.

Figure 1:
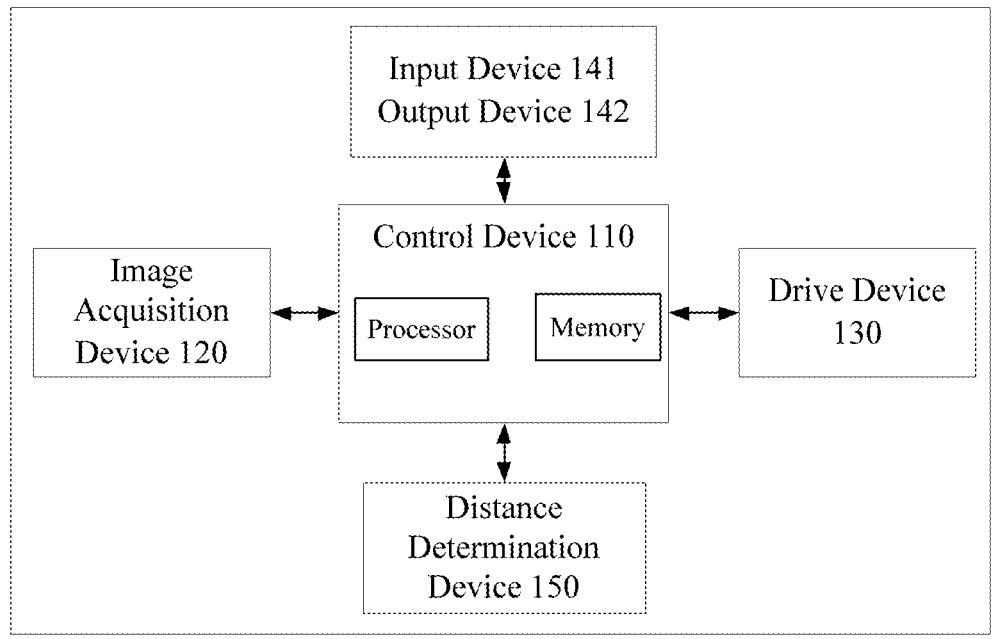
FIG. 1 is an illustrative block diagram of a motion control system for a seat, provided by one embodiment of the present disclosure.

For example, FIG. 1 is an illustrative block diagram of a motion control system 100 for a seat, provided by one embodiment of the present disclosure. As illustrated in FIG. 1, the motion control system 100 for the seat comprises a control device 110, an image acquisition device 120 and a drive device 130. The image acquisition device 120 is configured to capture images of around the seat; the drive device 130 is configured to drive the seat to move; and the control device 110 is configured to track a current caregiver by performing image recognition based on the images captured by the image acquisition device 120, determine a relative position between the current caregiver and the seat, and control the drive device 130 to move the seat based on the relative position.

For example, the image acquisition device 120 includes at least one first image acquisition unit. The first image acquisition unit is mounted on the seat and configured to capture images of around the seat and provide the captured images to the control device 110 in a form of electric signals. For example, the first image acquisition unit can be a camera. The number and the position of the first image acquisition units can be set based on the shape of the seat and actual applications demands, and are not limited to the case illustrated in the embodiment of the present disclosure. For example, the image acquisition device 120 can include four first image acquisition units. For example, one first image acquisition unit can be respectively arranged at front, rear, left and right side of the lower part of the seat (for example, the first image acquisition units can be arranged in areas on the lower part of the seat which cannot be shielded by the person to be nursed). For another example, one first image acquisition unit can be respectively arranged on the back of the seat, on the left armrest, on the right armrest, and on the front fence. For example, according to actual application demands, the image acquisition direction (for example, the normal vector of the image acquisition plane) of the first image acquisition unit can have the capability of pitch adjustment and/or horizontal rotation adjustment.

For example, the drive device 130 can drive the seat to rotate according to an instruction of the control device 110, and can also drive the seat to do translational movement (for example, moving forwards and/or moving backwards) base on the instruction of the control device 110. For example, the drive device 130 can be mounted at the bottom of the seat. For example, the drive device 130 can include a motion controller. The motion controller can drive the seat to rotate or move based on the instruction of the control device 110. For example, the drive device 130 can also include a motor, a power module (for example, a chargeable battery), a rotation mechanism and a translation mechanism. Thus, the motion controller can also drive the seat to do rotation or translation motion (linear or curvilinear motion) based on the instruction of the control device 110. For example, the translation mechanism can include two driving wheels and two universal follower wheels. The two driving wheels are arranged on both sides at the front of a chassis, and the two universal follower wheels are arranged on both sides at the rear of the chassis. The concrete structure of the drive device 130 can be set based on the actual application requirements, and is not limited to the case illustrated in the embodiment of the present disclosure. Obviously, the translation mechanism can also adopt a caterpillar chain, a walking leg, and the like.

For example, the control device 110 can include a processor and a memory. The processor, for example, is a central processing unit (CPU) or a processing unit in other forms having data processing capability and/or instruction execution capability. For example, the processor can be implemented as a general-purpose processor (GPP) and can also be a microcontroller, a microprocessor, a digital signal processor (DSP), a special-purpose image processing chip, a field programmable logic array (FPLA), and the like. The memory, for example, can include a volatile memory and/or a non-volatile memory, for example, can include a read-only memory (ROM), a hard disk, a flash memory, and the like. Correspondingly, the memory can be implemented as one or more computer program products. The computer program products can include computer readable storage media in various forms. One or more computer program instructions can be stored in the computer readable storage medium. The processor can run the program instructions to realize the function of the control device in the embodiment of the present disclosure as described below and/or other desired functions, for example, can control other devices (for example, the image acquisition device 120 and the drive device 130) of the motion control system 100 for the seat to execute the desired functions. The memory can also store various other application programs and various data, for example, feature information data of the caregivers, and various data applied to and/or generated by the application programs.

For example, the control device 110 can be arranged on the seat. In such a case, the transfer of information, instructions and the like between the control device 110 and the image acquisition device 120 and the drive device 130 can be implemented by wires between the control device 110 and the image acquisition device 120 and the drive device 130. The transfer of information, instructions and the like between the control device 110 and the image acquisition device 120 and the drive device 130 can also be implemented by wired or wireless communications through, for example, a communication device (not shown in the figure).

For example, the communication device can be communicated with other devices (for example, a personal computer, a server, a mobile station and a base station) via network or other technologies. The network can be Internet, wireless local area network (WLAN), mobile communication network, and the like. The other technologies, for example, can include Bluetooth communication, infrared communication, and the like.

For example, the control device 110 can also be separately arranged from the seat. In such a case, the functions of the control device 110 can be implemented by a desk computer, a notebook computer, a tablet PC or a mobile phone. The transfer of information, instructions and the like between the control device 110 and the image acquisition device 120 and the drive device 130 can be implemented via, for example, a communication device. For example, the images captured by the image acquisition device 120 are transmitted to the mobile phone through the communication device and Bluetooth, and the mobile phone analyzes the images and sends a rotation and/or translation instruction to the motion controller of the control device 110 through the communication device and Bluetooth. Thus, the cost of the seat can be reduced.

For example, the motion control system 100 for the seat can further comprise an input device 141. The input device 141 can be a device which is adopted by the user to input instructions and/or information, and can include one or more selected from a keyboard, a mouse, a microphone, a touch panel, a camera, and the like. For example, the instruction can be an instruction to turn on the motion control system 100 for the seat. For another example, the instruction can also be an instruction to set the priority of candidate caregivers. For example, the above-mentioned instruction can be in a form of character, hand signal, voice, human motion, and the like. The above-mentioned information can be an image, a video or an audio of the caregiver. For example, the microphone in the input device 141 can record the voice of the caregiver.

For example, the motion control system 100 for the seat can further comprise an output device 142. The output device 142 can output various kinds of information (for example, image or voice) to the outside (for example, the user), and can include one or more of a display, a loudspeaker, and the like. For example, the display in the output device 142 can display parameter setting information of the motion control system 100 for the seat. For another example, the loudspeaker in the output device 142 can output an alarm to the caregiver when the person to be nursed acts in a dangerous way (for example, when the person to be nursed tries to stand). For another example, the display and the loudspeaker in the output device 142 can display real-time video and audio of the caregiver, so as to appease the mood of the person to be nursed (for example, the child).

For example, the input device 141 and/or the output device 142 can be arranged on the seat. In such a case, the transfer of information, instructions and the like between the input device 141 and/or the output device 142 and the control device 110 can be implemented by wires between the input device 141 and/or the output device 142 and the control device 110 or a communication device. For example, the input device 141 and/or the output device 142 can be separately arranged from the seat. In such a case, the functions of the input device 141 and/or the output device 142 can be implemented by a desk computer, a notebook computer, a tablet PC or a mobile phone; and the transfer of information, instructions and the like between the input device 141 and/or the output device 142 and the control device 110 can be implemented by wires between the input device 141 and/or the output device 142 and the control device 110 or a communication device. For example, the input device 141 and/or the output device 142 can also simultaneously include a special-purpose unit arranged on the seat and one or more selected from the desk computer, the notebook computer, the tablet PC and the mobile phone. The user can select the input device 141 and/or the output device 142 according to use preferences.

For example, the motion control system 100 for the seat further comprises a distance determination device 150. The distance determination device 150 is configured to measure and/or calculate a current distance between the seat and the current caregiver, and convert corresponding measuring results into electric signals and provide the electric signals to the control device 110. For example, the distance determination device 150 can be comprises at least one image acquisition unit and a range finder (for example, an infrared, laser or ultrasonic ranging sensor). For example, the range finger can be arranged under the seat. The direction of a normal vector of a working surface of the range finger (for example, an infrared light receiving surface of the infrared ranging sensor) can be subjected to pitch and/or horizontal rotation adjustment according to actual application demands. For example, the distance determination device 150 can also be a device formed by at least one image acquisition unit (for example, one or two). In such a case, the current distance between the current caregiver and the seat can be calculated by monocular stereo vision range finding technology and/or binocular stereo vision range finding technology.

For example, in one example, the image acquisition device 120 can also include at least one second image acquisition unit. The second image acquisition unit is mounted on the seat and configured to monitor the person to be nursed. For example, the seat can include a dining board, and the second image acquisition unit can be mounted on a side of the dining board far away from the seat. According to actual application demands, a pillar with certain height (for example, 10 cm) can be arranged between the second image acquisition unit and the dining board, and the second image acquisition unit can also have pitch and/or horizontal rotation adjustment capability. The behaviors of the person to be nursed can be recognized or analyzed based on the images or videos captured by the second image acquisition unit, so as to determine whether the person to be nursed acts in a dangerous way or not. When the person to be nursed acts in a dangerous way, an alarm can be outputted by the output device 142 to alarm the caregiver to check on the person to be nursed and prevent the person to be nursed from being hurt by the dangerous act.

For example, the recognition of the human behaviors can be based on template matching method. For example, the human behavior recognition method based on template matching method can be implemented by the following steps: firstly, capturing the conventional dangerous behaviors (for example, trying to stand on the seat) of the person to be nursed, and storing the captured behaviors into a dangerous behavior template library; secondly, converting videos of the person to be nursed captured by the second image acquisition unit into image sequences in a case that the second image acquisition unit captures videos instead of image sequences; and thirdly, comparing the image sequences with the dangerous behavior template library, determining whether the person to be nursed acts in a dangerous way or not, and allowing the control device 110 to transmit an instruction of giving out a voice alarm to the output device 142 and control the loudspeaker to give out an alarm if the person to be nursed acts in a dangerous way. The algorithm based on template matching can be divided into frame-to-frame matching method and fusion matching method. The methods mainly include: motion energy image (MEI), motion history image (MHI), mean motion shape (MMS) based on contour, and average motion energy (AME) based on motion foreground. No limitation will be given in the embodiment of the present disclosure to the human behavior recognition/analysis method and the algorithm adopted to execute human behavior recognition/analysis.

At least one embodiment of the present disclosure provides a motion control method for a seat. The method comprises: capturing images of around the seat, and tracking a current caregiver by image recognition; determining a relative position between the current caregiver and the seat; and controlling a motion of the seat based on the relative position.

Figure 2:
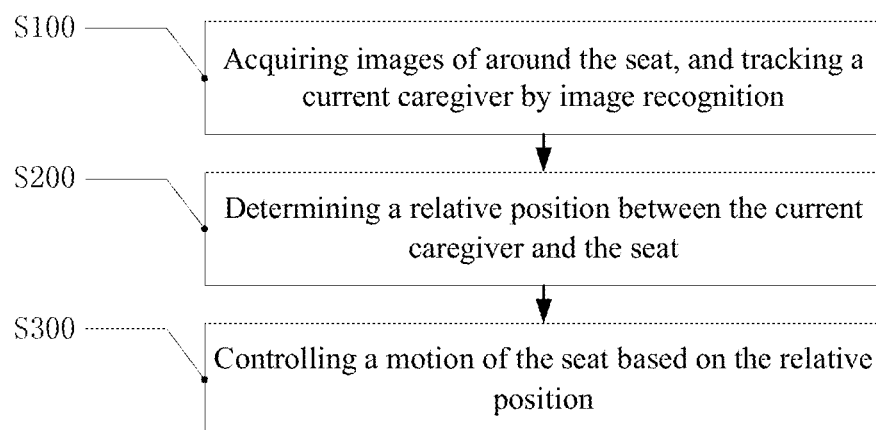
FIG. 2 is a flow diagram of a motion control method for a seat, provided by another embodiment of the present disclosure.

FIG. 2 is a flow diagram of a motion control method for a seat, provided by another embodiment of the present disclosure. As illustrated in FIG. 2, the motion control method for the seat can comprise the following steps:

S100: acquiring images of around the seat, and tracking a current caregiver by image recognition;

S200: determining a relative position between the current caregiver and the seat; and S300: controlling the motion of the seat based on the relative position.

For example, in the step S100, the images of around the seat can be captured by image acquisition units, and image recognition can be implemented by the following steps:

S110: determining the current caregiver;

S120: extracting a current feature information of the current caregiver; and

S130: tracking the current caregiver.

In the step S110, for example, the current caregiver can be determined by executing a query at a set interval (scanning period), so as to determine a new current caregiver in a case that the current caregiver goes out for some reason and cannot return in time to a position near the caregiver. For example, the scanning period can be set according to actual application demands. For example, the scanning period can be 30 minutes; however, the embodiment of present application is not limited to the case. For example, the step of determining the current caregiver can be determining the current caregiver by manual settings and/or automatically determining the current caregiver. For example, the step of determining the current caregiver by manual settings can be manually determining the current caregiver through the input device after browsing the images acquired by the image acquisition device.

For example, the steps of automatically determining the current caregiver can be implemented by the following steps:

S111: extracting feature information of the humans in captured images;

S112: determining an candidate caregiver list by performing feature matching between the feature information of the humans and feature information in an candidate caregiver feature library; and S113: determining the current caregiver based on preset priority information of caregivers and the candidate caregiver list.

In the step S111, the control device receives images of the humans and the environment around the seat captured by the image acquisition device at first, and then extracts the feature information of the humans in the captured images. According to actual application demands, the extracted feature information of the humans in the captured images, for example, can include one or a combination selected from contour feature information, head feature information, and facial feature information. The extraction of contour features, head features and facial features can refer to the conventional feature extraction method, for example, determining the contour by mathematical morphology method, gradient-based approach or level set method. No limitation will be given in the embodiment of the present disclosure to the extraction method of the contour features, the head features and the facial features.

In the step S112, the candidate caregiver feature library stores feature information of the candidate caregivers. The candidate caregiver feature library, for example, can be obtained by the steps S411-S413:

S411: acquiring photos of the candidate caregivers by image capturing and/or image inputting before the current usage of the seat;

S412: extracting the feature information of the candidate caregivers in the photos of the candidate caregivers; and S413: storing the feature information of the candidate caregivers and obtaining the candidate caregiver feature library.

In the step S411, for example, when the seat is in use for the first time, the candidate caregivers (namely caregivers capable of taking care of the person to be nursed) can be subjected to information acquisition. Information acquisition can be implemented by using the image acquisition unit to take pictures on the spot, and can also be implemented by adopting the input device to input the photos of the candidate caregivers. For example, the photo of the candidate caregiver can only include the head of the candidate caregiver and can also include the whole body of the candidate caregiver. Obviously, newly added candidate caregivers can be subjected to information acquisition at any time before the current usage of the seat.

In the step S412, the feature information of the candidate caregiver includes contour features, head features and facial features. The extraction of the contour features, the head features and the facial features can refer to the conventional extraction method of the contour features, the head features and the facial features. No further description will be given herein.

In the step S413, for example, the candidate caregiver feature library can be stored in the memory and can be accessed by the control device.

The candidate caregivers of around the seat can be obtained and the candidate caregiver list can be determined by performing feature matching between the feature information of the humans extracted in the step S111 and the feature information of the candidate caregiver feature library obtained in the steps S411-S413. The feature matching method can refer to conventional feature matching methods. For example, feature matching can adopt template matching method, feature matching method or frequency domain matching method. No limitation will be given to the feature matching method in the embodiment of the present disclosure.

In the step S113, the preset priority information of the caregivers, for example, can be set through the input device and stored into the memory, and can be accessed by the control device. The current caregiver can be determined based on the preset priority information of the caregivers and the candidate caregiver list. The current caregiver is a candidate caregiver with the highest priority in the candidate caregiver list.

Although the feature information of the current caregiver, for example, the contour features, the head features and/or the facial features, has been stored in the candidate caregiver feature library, the image acquisition unit can be impossible to acquire some or all of the above features without disruptions and hence can be impossible to track the current caregiver without disruptions. For example, when the current caregiver has his/her back to the seat, the image acquisition unit cannot acquire a face image of the current caregiver, and hence cannot extract the facial features of the current caregiver. For another example, when there is shielding between the current caregiver and the seat, the image acquisition unit cannot acquire a whole body image of the current caregiver, and hence cannot extract body contour features of the current caregiver.

The above-mentioned problems, for example, can be solved by the step of extracting the current feature information of the current caregiver in the step S120. For example, the current feature information not only includes one or a combination of the contour features, the head features and the facial features but also includes one or a combination selected from color feature information of the clothes, texture feature information of the clothes, color feature information of the shoes, and texture feature information of the shoes.

Color feature is described by the color feature of an image or an image area. For example, the color feature can be extracted through color histogram, color set or color moment method. Texture feature is similar to color feature and is also an overall feature. For example, texture feature can be extracted by structural approach, signal processing method, geometric method, model method or statistical method. Shape feature extraction includes regional feature extraction and contour feature extraction. Regional feature extraction mainly aims to the entire shape region of an image, and the contour feature aims to the outer boundary of an object. For example, the shape features can be extracted by boundary characteristic value method (the outer boundary of the image), geometric parameter method (parameterization of image geometry), invariant moment method of shape (finding out invariant moment features of image) or Fourier shape description method (Fourier transform method). Therefore, no limitation is given to the extraction method of the feature information in the embodiment of the present disclosure.

For example, the step of extracting the current feature information of the current caregiver can be implemented by the steps S121-S123:

S121: extracting the contour of the current caregiver;

S122: dividing the contour of the current caregiver; and

S123: extracting the current feature information of the current caregiver within the contour range.

The step of extracting the contour of the current caregiver can prevent the environmental characteristics or the features of other humans in the image from interfering with the extraction of the current feature information of the current caregiver. The step of dividing the contour of the current caregiver and extracting the current feature information of the current caregiver within the contour, for example, can improve the extraction efficiency of targeted features, and prevent other features from interfering with the extraction of a target feature. For example, the facial features exist only in the head contour, and texture and color features of the coat exist only in the trunk contour. The contour extraction and contour division method can refer to the conventional contour extraction and contour division method, so no further description will be given herein.

In the step S130, for example, the step of tracking the current caregiver can be implemented by the steps S131 and S132:

S131: extracting the feature information of the humans in the captured images; and S132: performing feature matching between the feature information of the humans and the feature information of the determined current caregiver.

In the step S131, for example, the feature information of the humans in the captured images includes one or a combination selected from contour feature information, head feature information, facial feature information, color feature information of the clothes, texture feature information of the clothes, color feature information of the shoes, and texture feature information of the shoes. The extraction method of the feature information of the humans in the captured images can refer to the feature extraction method in the step S120, so no further description will be given herein.

In the step S132, for example, the current caregiver can be tracked and locked by feature matching of the feature information of the humans in the captured images and the feature information of the determined caregiver, and then the relative position between the current caregiver and the seat can be determined, and finally the motion of the seat can be controlled based on the relative position. The feature matching method can refer to the conventional feature matching method. For example, feature matching can be performed by template matching method, feature matching method or frequency domain matching. No limitation is given to the feature matching method in the embodiment of the present disclosure.

In the step S200, the step of determining the relative position between the current caregiver and the seat can include: analyzing whether or not the current caregiver is in front of the seat based on the images of around the seat. For example, the current caregiver being in front of the seat indicates that the person to be nursed can see the current caregiver (for example, clearly seeing the behavior and action of the current caregiver) without rotating the head. For another example, according to actual application demands, the current caregiver being in front of the seat can also indicate that the person to be nursed can see the current caregiver in a case of rotating the head for a certain angle (for example, 10 degrees), thus, the rotation frequency of the seat can be reduced, and the use experience of the person to be nursed can be improved. For example, whether or not the current caregiver is in front of the seat can be determined by analyzing which of the first image acquisition unit captures the current caregiver. For example, when the first image acquisition unit arranged on the front of the seat captures the current caregiver, it indicates that the current caregiver is in front of the seat. For example, when the first image acquisition unit arranged at the rear of the seat captures the current caregiver, it indicates that the current caregiver is not in front of the seat.

In the step S200, the step of determining the relative position between the current caregiver and the seat can also include: determining the current distance between the seat and the current caregiver. According to actual application demands, the current distance between the current caregiver and the seat at least can be determined by the following three methods. No limitation is given in the embodiment of the present disclosure to the determination method of the current distance between the current caregiver and the seat.

(1) Measuring the current distance between the current caregiver and the seat by utilization of the first image acquisition unit and the range finder mounted on the seat.

For example, an infrared ranging sensor or an eye safe laser range finder can be implemented as the range finder. No limitation is given to the type of the range finder in the embodiment of the present disclosure. For example, the range finder can be mounted on a side of the dining board far away from the seat. For example, firstly, the azimuth information of the current caregiver (for example, the angle between the normal vector of the back of the seat and the connection line of the current caregiver and the seat) can be determined by the first image acquisition unit; secondly, the seat can be rotated based on the azimuth information of the current caregiver, so that the current caregiver can be in front of the seat; thirdly, the contour of the current caregiver can be determined by adoption of the first image acquisition unit arranged on the front side of the seat; and finally, electromagnetic waves (for example, laser) are emitted by the range finder to the region within the contour of the current caregiver, and the current distance between the current caregiver and the seat can be obtained based on the time delay between emitting electromagnetic waves and receiving the corresponding electromagnetic waves.

(2) Calculating the current distance between the current caregiver and the seat by utilization of one first image acquisition unit mounted on the seat and the monocular stereo vision range finding technology.

For example, monocular range finding can adopt reference object method or memory model comparison method. For example, information such as the height, the head length or the head width of the candidate caregivers can be acquired during initial information acquisition process; before the use of the seat, the current caregiver can stand at a predetermined position in front of the image acquisition unit; the image acquisition unit captures at least one initial image of the current caregiver; and subsequently, the current distance between the current caregiver and the seat can be obtained based on the proportion of the current caregiver in a real-time image, acquired by the image acquisition unit during the use of the seat, to the entire image.

(3) Calculating the current distance between the current caregiver and the seat by utilization of two first image acquisition units mounted on the seat and the binocular stereo vision range finding technology.

For example, the two first image acquisition units can be arranged on the front side of the seat. The binocular stereo vision range finding principle is to adopt two cameras to acquire image coordinates of a target point, formed from different viewing angles, from two viewpoints, obtain three-dimensional coordinates of the target point by using an imaging geometric model to calculate image coordinate deviation of homologous image points, and hence realize distance measurement.

In a case that the monocular stereo vision range finding technology and/or the binocular stereo vision range finding technology is adopted, the range finder is not required to be mounted, not only the cost of the seat system can be reduced but also the use safety of the seat can be enhanced. In addition, as the current distance between the current caregiver and the seat can be obtained without rotating the seat to allow the current caregiver to be in front of the seat, the adoption of the monocular stereo vision range finding technology and/or the binocular stereo vision range finding technology can also improve the response speed of position control of the seat.

In the step S300, the step of controlling the motion of the seat based on the relative position can include: rotating the seat to allow the current caregiver to be in front of the seat in a case that the current caregiver is not in front of the person to be nursed. For example, whether or not the current caregiver is in front of the seat can be determined by analyzing which of the first image acquisition unit captures the current caregiver, and subsequently, the rotation direction and the rotation angle can be determined based on the azimuth information of the current caregiver. For example, when the current caregiver is captured by the first image acquisition unit arranged on the left armrest of the seat (for example, used for acquiring images of the environment on the left of the seat), it indicates that the current caregiver is not in the front of the seat; in such a case, the seat can be rotated to the left for, for example, 90 degrees, so that the current caregiver can be in front of the seat.

In the step S300, the step of controlling the motion of the seat based on the relative position can also include: moving the seat until the seat is within a preset distance range in a case that the current distance exceeds the preset distance range. For example, whether or not the seat is within the preset distance range (for example, within 2.5 m) can be determined by determining the current distance between the current caregiver and the seat with the method in the step S200. If the distance between the seat and the current caregiver is greater than the preset distance range, the seat can be moved to allow the seat to be within the preset distance range.

Figure 3:
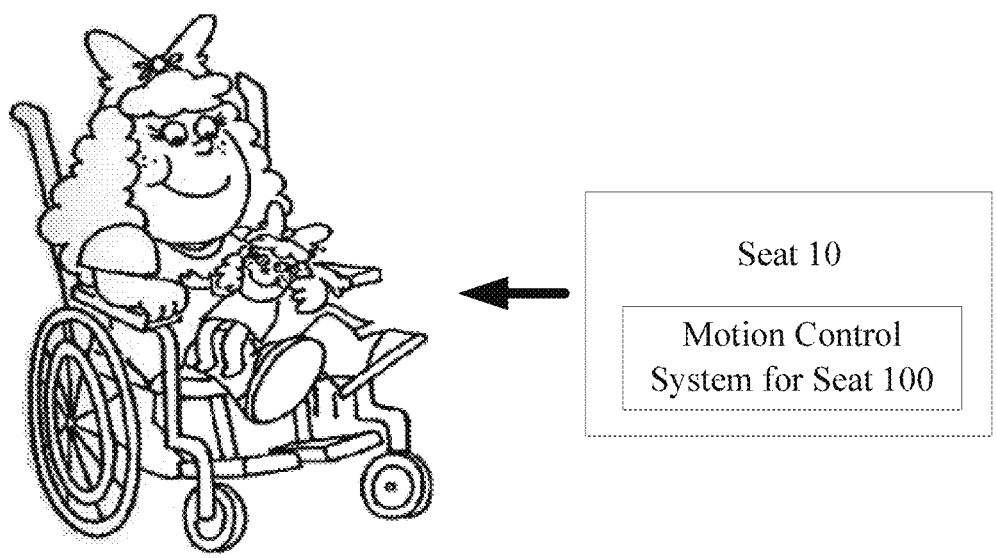
FIG. 3 is a schematic diagram of a seat provided by further another embodiment of the present disclosure.

FIG. 3 is a schematic diagram of a seat 10 provided by further another embodiment of the present disclosure. As illustrated in FIG. 3, the seat 10 comprises the motion control system 100 for the seat provided by any embodiment of the present disclosure. It should be noted that other necessary components/devices of the seat 10 can adopt conventional components/devices, are not further described herein, and shall not be construed as the limitation of the present disclosure. The automatic rotation and/or translation of the seat can be realized by introducing the motion control system 100 for the seat.

Still another embodiment of the present disclosure provides a motion control system for a seat, which comprises an image acquisition device, a drive device, a processor, a memory and computer program instructions stored in the memory. The following steps are executed when the processor runs the computer program instructions: tracking a current caregiver by performing image recognition based on acquired images of around the seat; determining a relative position between the current caregiver and the seat on the basis of acquired position information; and controlling the drive device to move the seat based on the relative position. Moreover, the steps S110-S130, S111-S113, S411-S413, S121-S123 or S131-S132 can also be executed when the processor runs the computer program instructions stored in the memory.

Embodiments of the present disclosure provide a seat, a motion control method for the seat, and a motion control system for the seat, and therefore automatic rotation and/or translation of the seat can be realized.

What are described above is related to the illustrative embodiments of the disclosure only and not limitative to the scope of the disclosure; the scopes of the disclosure are defined by the accompanying claims.

The application claims priority to the Chinese patent application No. 201710005216.0, filed Jan. 4, 2017, the entire disclosure of which is incorporated herein by reference as part of the present application.

What is claimed is:

1. A motion control system for a seat, comprising: an image acquisition device, a drive device, a control device, a range finger, an input device, and an output device,
   wherein the image acquisition device comprises four first image acquisition units at a front side, a rear side, a left side and a right side of a lower part of the seat, and a second image acquisition unit on the seat;
   the four first image acquisition unit are configured to capture images of around the seat;
   the second image acquisition unit is configured to capture images or videos of a person to be nursed;
   the control device is configured to determine and track a current caregiver, for taking care of the person to be nursed, around the seat by performing image recognition based on the images captured by the four first image acquisition unit;
   the current caregiver is determined through determining a candidate caregiver list by performing image recognition and through determining the current caregiver based on preset priority information of caregivers and the candidate caregiver list;
   the range finger is on the seat and configured to measure a current distance between the seat and the current caregiver;
   the drive device is further configured to configured to drive the seat to move; and
   the control device is further configured to determine a relative position between the current caregiver and the seat and control the drive device to move the seat based on the relative position;
   determining of the relative position between the current caregiver and the seat and controlling of the motion of the seat based on the relative position comprise:
   determining the current distance between the seat and the current caregiver; and
   moving the seat until the seat is within a preset distance range in a case that the current distance exceeds the preset distance range;
   the control device is further configured to determine whether or not the person to be nursed acts in a dangerous way by performing behavior analysis on the images or videos captured by the second image acquisition unit through comparing the images captured by the second image acquisition unit or images converted from the videos captured by the second image acquisition unit and a dangerous behavior template library;
   the output device is configured to output, under a control of the control device, an alarm when the person to be nursed acts in a dangerous way; and
   the input device is configured to input an instruction to provide the preset priority information of caregivers.

2. The motion control system according to claim 1, wherein the input device comprises a touch panel or a microphone on the seat, and the output device comprises a loudspeaker on the seat.

3. The motion control system according to claim 1, wherein the input device and the output device are separately arranged from the seat.

4. The motion control system according to claim 1, wherein the output device on the seat is further configured to display real-time video or audio of the caregiver.

5. The motion control system according to claim 1, wherein the control device is further configured to determine whether or not the current caregiver leaves through executing a query at a set interval and to determine a new caregiver when it is determined that the current caregiver leaves.

6. The motion control system according to claim 1, wherein the seat comprises a dining board, and the second image acquisition unit is on a side of the dining board away from a region, for accommodating the person to be nursed, of the seat.

7. The motion control system according to claim 1, wherein the four first image acquisition unit have at least one of a pitch adjustment capability and a horizontal rotation adjustment capability.

8. The motion control system according to claim 1, wherein the drive device is at a bottom of the seat and comprises a motion controller.

9. The motion control system according to claim 1, wherein the control device is separately arranged from the seat, and functions of the control device is implemented by a desk computer, a notebook computer, a tablet PC or a mobile phone.

* * * * *